United States Patent
King et al.

(10) Patent No.: US 9,451,304 B2
(45) Date of Patent: Sep. 20, 2016

(54) SOUND FEATURE PRIORITY ALIGNMENT

(71) Applicant: Adobe Systems Incorporated, San Jose, CA (US)

(72) Inventors: Brian John King, Seattle, WA (US); Gautham J. Mysore, San Francisco, CA (US); Paris Smaragdis, Urbana, IL (US)

(73) Assignee: Adobe Systems Incorporated, San Jose, CA (US)

(*) Notice: Subject to any disclaimer, the term of this patent is extended or adjusted under 35 U.S.C. 154(b) by 343 days.

(21) Appl. No.: 13/688,421

(22) Filed: Nov. 29, 2012

(65) Prior Publication Data
US 2014/0148933 A1 May 29, 2014

(51) Int. Cl.
| | |
|---|---|
| G06F 17/00 | (2006.01) |
| H04N 21/242 | (2011.01) |
| H04N 21/233 | (2011.01) |
| H04N 21/43 | (2011.01) |
| H04N 21/439 | (2011.01) |
| G10H 7/00 | (2006.01) |
| G10L 21/04 | (2013.01) |

(52) U.S. Cl.
CPC .......... *H04N 21/242* (2013.01); *H04N 21/233* (2013.01); *H04N 21/4307* (2013.01); *H04N 21/4394* (2013.01); *G10H 7/008* (2013.01); *G10L 21/04* (2013.01)

(58) Field of Classification Search
CPC .................. G06F 17/30017; G06F 17/30743; G10H 2210/385; G10H 2220/116; G10H 7/008; G10L 21/04; G11B 27/031
See application file for complete search history.

(56) References Cited

U.S. PATENT DOCUMENTS

| | | | |
|---|---|---|---|
| 4,591,928 A * | 5/1986 | Bloom et al. | 360/13 |
| 5,151,998 A | 9/1992 | Capps | |
| 5,652,828 A | 7/1997 | Silverman | |
| 5,671,283 A | 9/1997 | Michener et al. | |
| 5,749,073 A | 5/1998 | Slaney | |
| 6,122,375 A | 9/2000 | Takaragi et al. | |
| 6,208,348 B1 | 3/2001 | Kaye | |
| 6,266,412 B1 | 7/2001 | Berenzweig et al. | |
| 6,316,712 B1 | 11/2001 | Laroche | |
| 6,333,983 B1 | 12/2001 | Enichen | |
| 6,370,247 B1 | 4/2002 | Takaragi et al. | |

(Continued)

FOREIGN PATENT DOCUMENTS

WO  WO-2010086317  8/2010

OTHER PUBLICATIONS

"Notice of Allowance", U.S. Appl. No. 13/309,982, Jul. 30, 2014, 6 pages.

(Continued)

*Primary Examiner* — Curtis Kuntz
*Assistant Examiner* — Thomas Maung
(74) *Attorney, Agent, or Firm* — Wolfe-SBMC

(57) ABSTRACT

Sound feature priority alignment techniques are described. In one or more implementations, features of sound data are identified from a plurality of recordings. Values are calculated for frames of the sound data from the plurality of recordings. The values are based on similarity of the frames of the sound data from the plurality of recordings to each other, the similarity based on the identified features and a priority that is assigned based on the identified features of respective frames. The sound data from the plurality of recordings is then aligned based at least in part on the calculated values.

20 Claims, 6 Drawing Sheets

(56) References Cited

U.S. PATENT DOCUMENTS

| | | |
|---|---|---|
| 6,778,667 B1 | 8/2004 | Bakhle et al. |
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,200,226 B2 | 4/2007 | Bace |
| 7,218,733 B2 | 5/2007 | Li et al. |
| 7,221,756 B2 | 5/2007 | Patel et al. |
| 7,350,070 B2 | 3/2008 | Smathers et al. |
| 7,400,744 B2 | 7/2008 | Nichani et al. |
| 7,418,100 B2 | 8/2008 | McGrew et al. |
| 7,536,016 B2 | 5/2009 | Benaloh |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,757,299 B2 | 7/2010 | Robert et al. |
| 7,827,408 B1 | 11/2010 | Gehringer |
| 7,884,854 B2 | 2/2011 | Banner et al. |
| 7,924,323 B2 | 4/2011 | Walker et al. |
| 8,099,519 B2 | 1/2012 | Ueda |
| 8,103,505 B1 | 1/2012 | Silverman et al. |
| 8,134,637 B2 | 3/2012 | Rossbach et al. |
| 8,184,182 B2 | 5/2012 | Lee et al. |
| 8,189,769 B2 | 5/2012 | Ramasamy et al. |
| 8,205,148 B1 | 6/2012 | Sharpe et al. |
| 8,300,812 B2 | 10/2012 | Van De Ven |
| 8,315,396 B2 | 11/2012 | Schreiner et al. |
| 8,345,976 B2 | 1/2013 | Wang et al. |
| 8,390,704 B2 | 3/2013 | Wang et al. |
| 8,428,390 B2 | 4/2013 | Li et al. |
| 8,447,098 B1 | 5/2013 | Cohen et al. |
| 8,520,083 B2 | 8/2013 | Webster et al. |
| 8,543,386 B2 | 9/2013 | Oh et al. |
| 8,548,226 B2 | 10/2013 | Sakano et al. |
| 8,571,305 B2 | 10/2013 | Kao |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,751,022 B2 | 6/2014 | Eppolito |
| 8,805,560 B1 | 8/2014 | Tzanetakis et al. |
| 8,855,334 B1* | 10/2014 | Lavine et al. ............... 381/119 |
| 8,879,731 B2 | 11/2014 | Schultz |
| 8,886,543 B1 | 11/2014 | Sharifi et al. |
| 8,914,290 B2 | 12/2014 | Hendrickson et al. |
| 8,953,811 B1 | 2/2015 | Sharifi et al. |
| 9,076,205 B2 | 7/2015 | Cho et al. |
| 9,135,710 B2 | 9/2015 | Cohen et al. |
| 9,201,580 B2 | 12/2015 | King et al. |
| 9,208,547 B2 | 12/2015 | Cohen et al. |
| 9,214,026 B2 | 12/2015 | Price et al. |
| 9,355,649 B2 | 5/2016 | King et al. |
| 2003/0028380 A1 | 2/2003 | Freeland et al. |
| 2004/0122662 A1* | 6/2004 | Crockett ............... G10L 21/04 704/200.1 |
| 2004/0254660 A1 | 12/2004 | Seefeldt |
| 2005/0198448 A1 | 9/2005 | Fevrier et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1* | 7/2006 | Bloom et al. ............... 381/56 |
| 2007/0041663 A1 | 2/2007 | Cho et al. |
| 2007/0061145 A1 | 3/2007 | Edgington et al. |
| 2007/0087756 A1 | 4/2007 | Hoffberg |
| 2007/0291958 A1 | 12/2007 | Jehan |
| 2009/0055139 A1 | 2/2009 | Agarwal et al. |
| 2009/0125726 A1 | 5/2009 | Iyer et al. |
| 2009/0195643 A1 | 8/2009 | Neuman |
| 2009/0279697 A1 | 11/2009 | Schneider |
| 2009/0306972 A1 | 12/2009 | Opitz et al. |
| 2010/0023864 A1 | 1/2010 | Lengeling et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0322042 A1 | 12/2010 | Serletic et al. |
| 2011/0043864 A1 | 2/2011 | Tian et al. |
| 2011/0112670 A1 | 5/2011 | Disch et al. |
| 2011/0173208 A1 | 7/2011 | Vogel |
| 2011/0230987 A1* | 9/2011 | Anguera Miro et al. ...... 700/94 |
| 2011/0261257 A1 | 10/2011 | Terry et al. |
| 2012/0046954 A1 | 2/2012 | Lindahl et al. |
| 2012/0056982 A1 | 3/2012 | Katz et al. |
| 2012/0130822 A1 | 5/2012 | Patwa et al. |
| 2012/0151320 A1 | 6/2012 | McClements, IV |
| 2012/0173865 A1 | 7/2012 | Swaminathan |
| 2012/0173880 A1 | 7/2012 | Swaminathan |
| 2012/0219229 A1 | 8/2012 | Springer et al. |
| 2012/0321172 A1 | 12/2012 | Jachalsky et al. |
| 2013/0064443 A1 | 3/2013 | Schlosser et al. |
| 2013/0113881 A1 | 5/2013 | Barnum |
| 2013/0127824 A1 | 5/2013 | Cohen et al. |
| 2013/0142330 A1 | 6/2013 | Schultz |
| 2013/0173273 A1 | 7/2013 | Kuntz et al. |
| 2013/0243313 A1 | 9/2013 | Civit et al. |
| 2013/0243314 A1 | 9/2013 | Civit et al. |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0133675 A1 | 5/2014 | King et al. |
| 2014/0135962 A1 | 5/2014 | King et al. |
| 2014/0136976 A1 | 5/2014 | King et al. |
| 2014/0140626 A1 | 5/2014 | Cho |
| 2014/0142947 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0310006 A1 | 10/2014 | Anguera Miro et al. |

OTHER PUBLICATIONS

"Final Office Action", U.S. Appl. No. 13/690,755, Sep. 10, 2014, 7 pages.

"Non-Final Office Action", U.S. Appl. No. 13/680,952, Aug. 4, 2014, 8 pages.

Zhu, et al.,' "Fusion of Time-of-Flight Depth and Stereo for High Accuracy Depth Maps", IEEE Conference on Computer Vision and Pattern Recognition, Jun. 23, 2008, 8 pages.

"Final Office Action", U.S. Appl. No. 13/309,982, (Nov. 1, 2013), 34 pages.

Felzenszwalb, Pedro F., et al., "Efficient Belief Propagation for Early Vision", *International Journal of Computer Vision*, 70(1), (2006), pp. 41-54.

Park, Youngja et al., "Extracting Salient Keywords from Instructional Videos Using Joint Text, Audio and Visual Cues", *Proceedings of the Human Language Technology Conference of the North American Chapter of the ACL*, Association for Computational Linguistics, 2006,(Jun. 2006), pp. 109-112.

Radhakrishnan, Regunathan et al., "A Content-Adaptive Analysis and Representation Framework for Audio Event Discovery from "Unscripted" Multimedia", *Hindawi Publishing Corporation, EURASIP Journal on Applied Signal Processing*, vol. 2006, Article ID 89013, (2006), 24 pages.

Smaragdis, Paris "A Probabilistic Latent Variable Model for Acoustic Modeling", NIPS (2006), 6 pages.

Smaragdis, Paris "Supervised and Semi-Supervised Separation of Sounds from Single-Channel Mixtures", *ICA'07 Proceedings of the 7th international conference on Independent component analysis and signal separation*, (2007), 8 pages.

(56) References Cited

OTHER PUBLICATIONS

Yang, Qingxiong et al., "A Constant-Space Belief Propagation Algorithm for Stereo Matching", *CVPR*, (2010), 8 pages.
"Non-Final Office Action", U.S. Appl. No. 13/309,982, Mar. 24, 2014, 35 pages.
"Non-Final Office Action", U.S. Appl. No. 13/690,755, Mar. 28, 2014, 7 pages.
"Non-Final Office Action", U.S. Appl. No. 13/309,982, (Jan. 17, 2013), 32 pages.
"Time Domain Pitch Scaling using Synchronous Overlap and Add", retrieved from <http://homepages.inspire.net.nz/~jamckinnon/report/sola.htm>on Nov. 12, 2012, 3 pages.
"Waveform Similarity Based Overlap-Add (WSOLA)", retrieved from <http://www.pjsip.org/pjmedia/docs/html/group_PJMED_WSOLA.htm>on Nov. 12, 2012, 4 pages.
De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos325/Bernardini.pdf>on Nov. 12, 2012, (Dec. 7, 2000), 7 pages.
Dolson, Mark "The Phase Vocoder: A Tutorial", retrieved from <http://www.panix.com/~jens/pvoc-dolson.par>on Nov. 12, 2012, 11 pages.
Gutierrez-Osuna, Ricardo "L19: Prosodic Modification of Speech", Lecture Based on [Taylor, 2009, ch. 14; Holmes, 2001, ch. 5; Moulines and Charpentier, 1990], retrieved from <http://research.cs.tamu.edu/prism/lectures/sp/I19.pdf>on Nov. 12, 2012, 35 pages.
He, et al., "Corner detector based on global and local curvature properties", Retrieved from <http://hub.hku.hk/bitstream/10722/57246/1/142282.pdf>on Dec. 21, 2012, (May 2008), 13 pages.
Hirsch, et al., "Fast Removal of Non-uniform Camera Shake", Retrieved from <http://webdav.is.mpg.de/pixel/fast_removal_camera_shake/files/Hirsch_ICCV2011_Fast%20removal%20of%20non-uniform%20camera%20shake.pdf<on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf>on Dec. 21, 2012, 8 pages.
Klingbeil, Michael "Spear: Sinusoidal Partial Editing Analysis and Resynthesis", retrieved from <http://www.klingbeil.com/spear/>on Nov. 12, 2012, 3 pages.
Levin, et al., "Image and Depth from a Convential Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf>on Dec. 21, 2012,(2007), 9 pages.
McAulay, R. J., et al., "Speech Processing Based on a Sinusoidal Model", *The Lincoln on Laboratory Journal*, vol. 1, No. 2, 1998, retrieved from <http://www.II.mite.edu/publications/journal/pdf/vol01_no2/1.2.3.speechprocessing.pdf> on Nov. 12, 2012,(1988), pp. 153-168
Moinet, Alexis et al., "PVSOLA: A Phase Vocoder with Synchronized Overlap-Add", Proc. of the 14th Int. Conference on Digital Audio Effects (DAFx-11), Paris, France, Sep. 19-23, 2011, retrieved from <http://tcts.fpms.ac.be/publications/papers/2011/dafx2011_pysola_amtd.pdf> Nov. 12, 2012,(Sep. 19, 2011), 7 pages.
Patton, Joshua "ELEC 484 Project—Pitch Synchronous Overlap-Add", retrieved from <http://www.joshpatton.org/yeshua/Elec484/Elec484_files/ELEC%20484%020-%20PSOLA%20Final%20Project%20Report.pdf> on Nov. 12, 2012, 11 pages.
Rodet, Xavier "Musical Sound Signal Analysis/Synthesis: Sinusoidal+Residual and Elementary Waveform Models", *TFTS'97 (IEEE Time-Frequency and Time-Scale Workshop 97)*, Coventry, Grande Bretagne, août, 1997, retrieved from <http://articles.ircam.fr/textes/Rodet97e/index.html>on Nov. 12, 2012,(1997),16 pages.

Roelands, Marc et al., "Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.28.1356>on Nov. 12, 2012, 4 pages.
Serra, Xavier "A System for Sound Analysis/Transformation/Synthesis Based on a Deterministic Plus Stochastic Decomposition", retrieved from <https://ccrma.stanford.edu/files/papers/stanm58.pdf>on nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related research.pdf>on Nov. 12, 2012, 21 pages.
Serra, Xavier "Musical Sound Modeling with Sinusoids Plus Noise", published in C. Roads, S. Pope, A. Picialli, G. De Poli, editors. 1997. "Musical Signal Processing". *Swets & Zeitlinger Publishers*, retrieved from <http://web.media.mit.edu/~tristan/Classes/MAS.945/Papers/Technical/Serra_SMS_97.pdf>on Nov. 12, 2012,(1997), 25 pages.
Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf>on Nov. 12, 2012, (Mar. 8, 2012), 15 pages.
Upperman, Gina "Changing Pitch with PSOLA for Voice Conversion", retrieved from <http://cnx.org/content/m12474/latest/?collection=col10379/1.1>on Nov. 12, 2012, 1 page.
Verhelst, Werner "Overlap-Add Methods for Time-Scaling of Speech", retrieved from >http://citeseerx.ist.psu.edu/viewdoc/summary?doi=10.1.1.128.7991>on Nov. 12, 2012, 25 pages.
Verhelst, Werner et al., "An Overlap-Add Techniques Based on Waveform Similarity (WSOLA) for High Quality Time-Scale Modification of Speech", retrieved from <http://citeseerx.ist.psu.edu/viewdoc/download?doi=10.1.1.202.5460&rep=rep1&type=pdf>on Nov. 12, 2012, 4 pages.
Yuan, et al., "Image Deblurring with Blurred/Noisy Image Pairs", *Proceedings of ACM SIGGRAPH*, vol. 26, Issue 3, (Jul. 2007), 10 pages.
"Non-Final Office Action", U.S. Appl. No. 13/681,643, Jan. 7, 2015, 10 pages.
"Non-Final Office Action", U.S. Appl. No. 13/675,844, Dec. 19, 2014, 10 pages.
"Non-Final Office Action", U.S. Appl. No. 13/675,807, Dec. 17, 2014, 18 pages.
"Restriction Requirement", U.S. Appl. No. 13/722,825, Oct. 9, 2014, 7 pages.
Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, (1998), pp. 337-344.
"Adobe Audition", User Guide, 2003, 196 pages.
"Final Office Action", U.S. Appl. No. 13/675,807, May 22, 2015, 24 pages.
"Final Office Action", U.S. Appl. No. 13/681,643, May 5, 2015, 14 pages.
"MPEG Surround Specification", International Organization for Standardization, Coding of Moving Pictures and Audio; ISO/IEF JTC 1/SC 29/WG 11; Bangkok, Thailand, Jan. 19, 2006, 186 pages.
"Non-Final Office Action", U.S. Appl. No. 13/675,711, Mar. 11, 2015, 14 pages.
"Non-Final Office Action", U.S. Appl. No. 13/690,755, Mar. 2, 2015, 8 pages.
"Non-Final Office Action", U.S. Appl. No. 13/720,258, Mar. 3, 2015, 14 pages.
"Non-Final Office Action", U.S. Appl. No. 13/722,825, Mar. 25, 2015, 17 pages.
"Notice of Allowance", U.S. Appl. No. 13/680,952, Mar. 17, 2015, 6 pages.
"Restriction Requirement", U.S. Appl. No. 13/690,724, Feb. 26, 2015, 6 Pages.
Ioffe,"Improved Consistent Sampling, Weighted Minhash and L1 Sketching", ICDM '10 Proceedings of the 2010 IEEE International Conference on Data Mining, Dec. 2010, 10 pages.

(56) References Cited

OTHER PUBLICATIONS

Jehan,"Creating Music by Listening", In PhD Thesis of Massachusetts Institute of Technology, Retrieved from <http://web.media.mit.edu/~tristan/Papers/PhD_Tristan.pdf>, Sep. 2005, 137 pages.

Su,"Over-Segmentation Based Background Modeling and Foreground Detection with Shadow Removal by Using Hierarchical MRFs", Proceedings of the 10th Asian conference on Computer vision—vol. Part III, Nov. 2010, 12 pages.

Yang,"Stereo Matching with Color-Weighted Correlation, Hierarchical Belief Propagation, and Occlusion Handling", IEEE Transactions on Pattern Analysis and Machine Intelligence, vol. 31 Issue 3, Mar. 2009, 13 pages.

"Adobe Audition 3.0 User Guide", 2007, 194 pages.

"Final Office Action", U.S. Appl. No. 13/675,711, Jun. 23, 2015, 14 pages.

"Final Office Action", U.S. Appl. No. 13/675,844, Aug. 14, 2015, 17 pages.

"Non-Final Office Action", U.S. Appl. No. 13/690,724, Jun. 18, 2015, 7 pages.

"Notice of Allowance", U.S. Appl. No. 13/675,807, Aug. 27, 2015, 6 pages.

"Notice of Allowance", U.S. Appl. No. 13/690,755, Jun. 5, 2015, 6 pages.

"Notice of Allowance", U.S. Appl. No. 13/720,258, Jul. 24, 2015, 8 pages.

"Notice of Allowance", U.S. Appl. No. 13/722,825, Aug. 28, 2015, 10 pages.

"Pre-Interview Communication", U.S. Appl. No. 13/720,316, Aug. 5, 2015, 3 pages.

"Supplemental Notice of Allowance", U.S. Appl. No. 13/680,952, Jun. 11, 2015, 3 pages.

"Supplemental Notice of Allowance", U.S. Appl. No. 13/690,755, Aug. 18, 2015, 4 pages.

Dueck,"Non-metric Affinity Propagation for Unsupervised Image Categorization", IEEE 11th International Conference on Computer Vision, 2007, Oct. 14, 2007, 8 pages.

Xiao,"Joint Affinity Propagation for Multiple View Segmentation", IEEE 11th International Conference on Computer Vision, 2007, Oct. 14, 2007, 7 pages.

"Corrected Notice of Allowance", U.S. Appl. No. 13/720,258, Nov. 13, 2015, 2 pages.

"Corrected Notice of Allowance", U.S. Appl. No. 13/722,825, Sep. 21, 2015, 4 pages.

"Corrected Notice of Allowance", U.S. Appl. No. 13/722,825, Nov. 16, 2015, 4 pages.

"Final Office Action", U.S. Appl. No. 13/681,643, Mar. 15, 2016, 25 pages.

"Final Office Action", U.S. Appl. No. 13/690,724, Dec. 10, 2015, 11 pages.

"First Action Interview Office Action", U.S. Appl. No. 13/720,316, Oct. 22, 2015, 4 pages.

"Non-Final Office Action", U.S. Appl. No. 13/675,844, Feb. 12, 2016, 17 pages.

"Non-Final Office Action", U.S. Appl. No. 13/681,643, Oct. 16, 2015, 27 pages.

"Non-Final Office Action", U.S. Appl. No. 13/690,724, Apr. 5, 2016, 11 pages.

"Non-Final Office Action", U.S. Appl. No. 13/720,316, Apr. 8, 2016, 14 pages.

"Notice of Allowance", U.S. Appl. No. 13/675,711, Jan. 20, 2016, 11 pages.

"Notice of Allowance", U.S. Appl. No. 13/720,258, Sep. 18, 2015, 2 pages.

"Sonar X1", Sonar, 2010, pp. 573,595-599.

Final Office Action, U.S. Appl. No. 13/675,844, Jul. 19, 2016, 16 pages.

\* cited by examiner

SOUND FEATURE PRIORITY ALIGNMENT

BACKGROUND

Sound alignment may be leveraged to support a wide range of functionality. For example, sound data may be captured for use as part of a movie, recording of a song, and so on. Parts of the sound data, however, may reflect capture in a noisy environment and therefore may be less than desirable when output, such as by being difficult to understand, interfere with desired sounds, and so on. Accordingly, parts of the sound data may be replaced by other sound data using sound alignment. Sound alignment may also be employed to support other functionality, such as to utilize a foreign overdub to replace the sound data with dialog in a different language.

However, conventional techniques that are employed to automatically align the sound data may sound unnatural when output. This may be due to changes caused by stretching and/or compressing of portions of the audio data to align the corresponding portions to each other. These changes in the sound data may cause differences that are perceptible to a user listening to the sound data and thus the result may sound unnatural to the user.

SUMMARY

Sound feature priority alignment techniques are described. In one or more implementations, features of sound data are identified from a plurality of recordings. Values are calculated for frames of the sound data from the plurality of recordings. The values are based on similarity of the frames of the sound data from the plurality of recordings to each other, the similarity based on the identified features and a priority that is assigned based on the identified features of respective frames. The sound data from the plurality of recordings is then aligned based at least in part on the calculated values.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Sound alignment techniques may be used to temporally align sound data, such as an overdub recording to a reference recording. This may be utilized to support a variety of functionality as previously described. Conventional sound alignment techniques typically treat the alignment of sound data at each instance in time as equally important, e.g., at each frame. However, this is not true for human perception. Human perception, for instance, generally has increased sensitivity to timing at the beginning of a phrase as opposed to an end of the phrase. Similarly, human perception is more sensitive to certain syllable sounds, such as transient attacks, than other syllables.

Accordingly, sound feature alignment techniques are described that may be employed to take into account differences in human perception. These techniques, for instance, may be used to dynamically prioritize frames according to human perception, rather than treating each frame as equally important. This may be based on sound feature rules that assign a priority based on features included in the frames. Accordingly, the features may be used to both align and prioritize how that alignment is to be performed, which may be used to promote sound alignment that has increased consistency with human perception. Further discussion of these and other techniques may be found in relation to the following sections.

In the following discussion, an example environment is first described that may employ the sound feature alignment techniques described herein. Example procedures are then described which may be performed in the example environment as well as other environments. Consequently, performance of the example procedures is not limited to the example environment and the example environment is not limited to performance of the example procedures.

Example Environment

Figure 1:
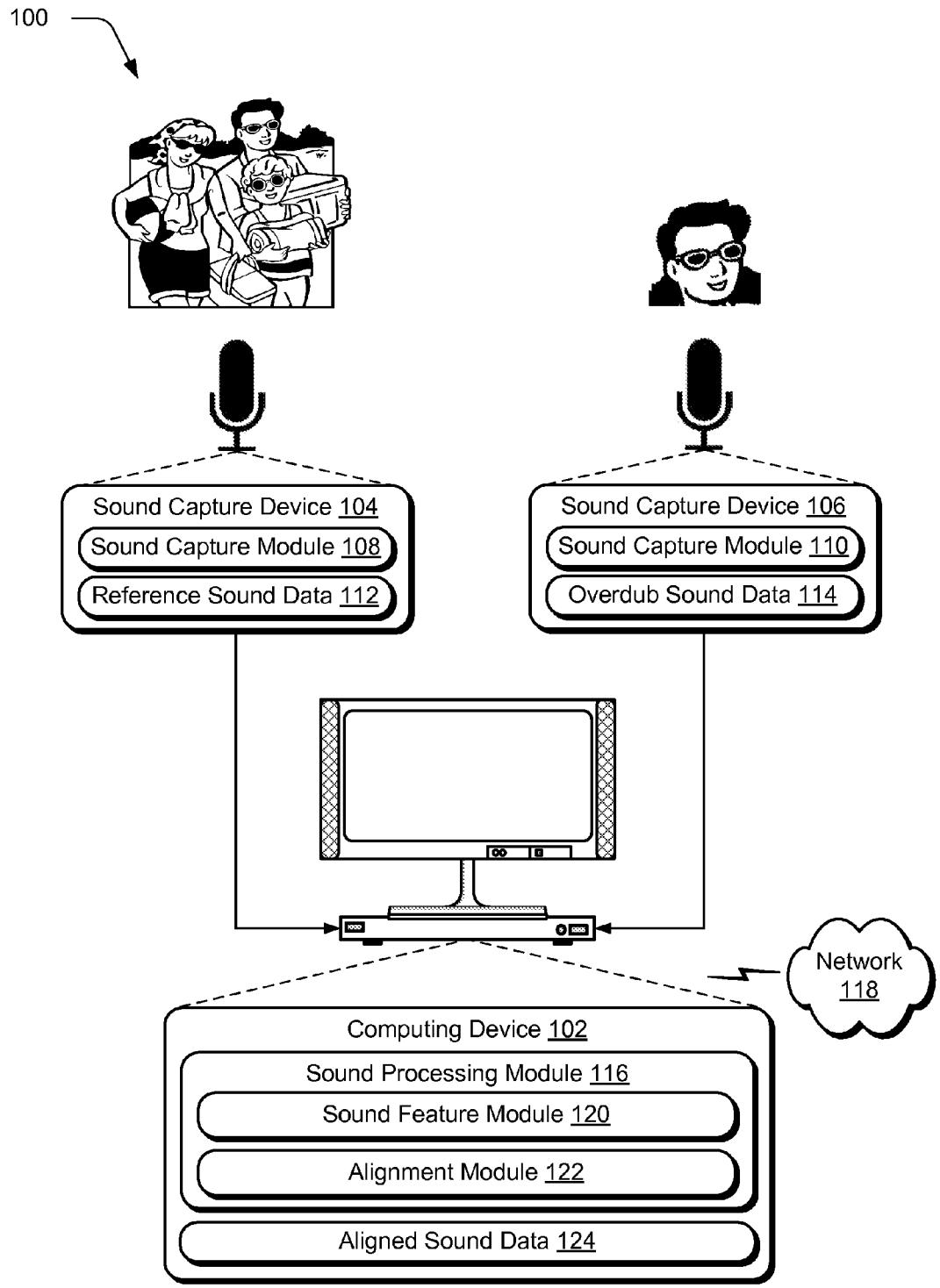
FIG. 1 is an illustration of an environment in an example implementation that is operable to employ sound feature alignment techniques as described herein.

FIG. 1 is an illustration of an environment 100 in an example implementation that is operable to employ the sound feature alignment techniques described herein. The illustrated environment 100 includes a computing device 102 and sound capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 6.

The sound capture devices 104, 106 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture devices 104, 106 are illustrated separately from the computing device 102, the sound capture devices 104, 106 may be configured as part of the computing device 102, a single sound capture device may be utilized in each instance, and so on.

The sound capture devices 104, 106 are each illustrated as including respective sound capture modules 108, 110 that are representative of functionality to generate sound data, examples of which include reference sound data 112 and overdub sound data 114. Reference sound data 112 is utilized to describe sound data for which at least a part is to be replaced by the overdub sound data 114. This may include replacement of noisy portions (e.g., due to capture of the reference sound data 112 "outside"), use of a foreign overdub, and even replacement using sound data that has different spectral characteristics. Thus, the overdub sound data 114 may reference unaligned sound data that is to be processed for alignment with the reference sound data 112. Additionally, although illustrated separately for clarity in the discussion it should be apparent that these roles may be satisfied alternately by different collections of sound data (e.g., in which different parts are taken from two or more files), and so on.

Regardless of where the reference sound data 112 and overdub sound data 114 originated, this data may then be obtained by the computing device 102 for processing by a sound processing module 116. Although illustrated as part of the computing device 102, functionality represented by the sound processing module 116 may be further divided, such as to be performed "over the cloud" via a network 118 connection, further discussion of which may be found in relation to FIG. 6.

An example of functionality of the sound processing module 116 is represented using a sound feature module 120 and an alignment module 122. The sound feature module 120 is representative of functionality to identify features in sound data. This may include identification of features used to generate sound feature rules as further described in relation to FIG. 2 as well as identification of features for application of the sound rules as further described in relation to FIG. 3, such as for alignment of sound data by the alignment module 122.

Thus, the alignment module 122 may be used to align the overdub sound data 114 to the reference sound data 112 to create aligned sound data 124. As previously described, this may be used to replace a noisy portion of sound data, replace dialog with other dialog (e.g., for different languages), and so forth. Further discussion of generation of the aligned sound data 124 using sound feature rules may be found beginning with the following discussion and associated figure.

Figure 2:
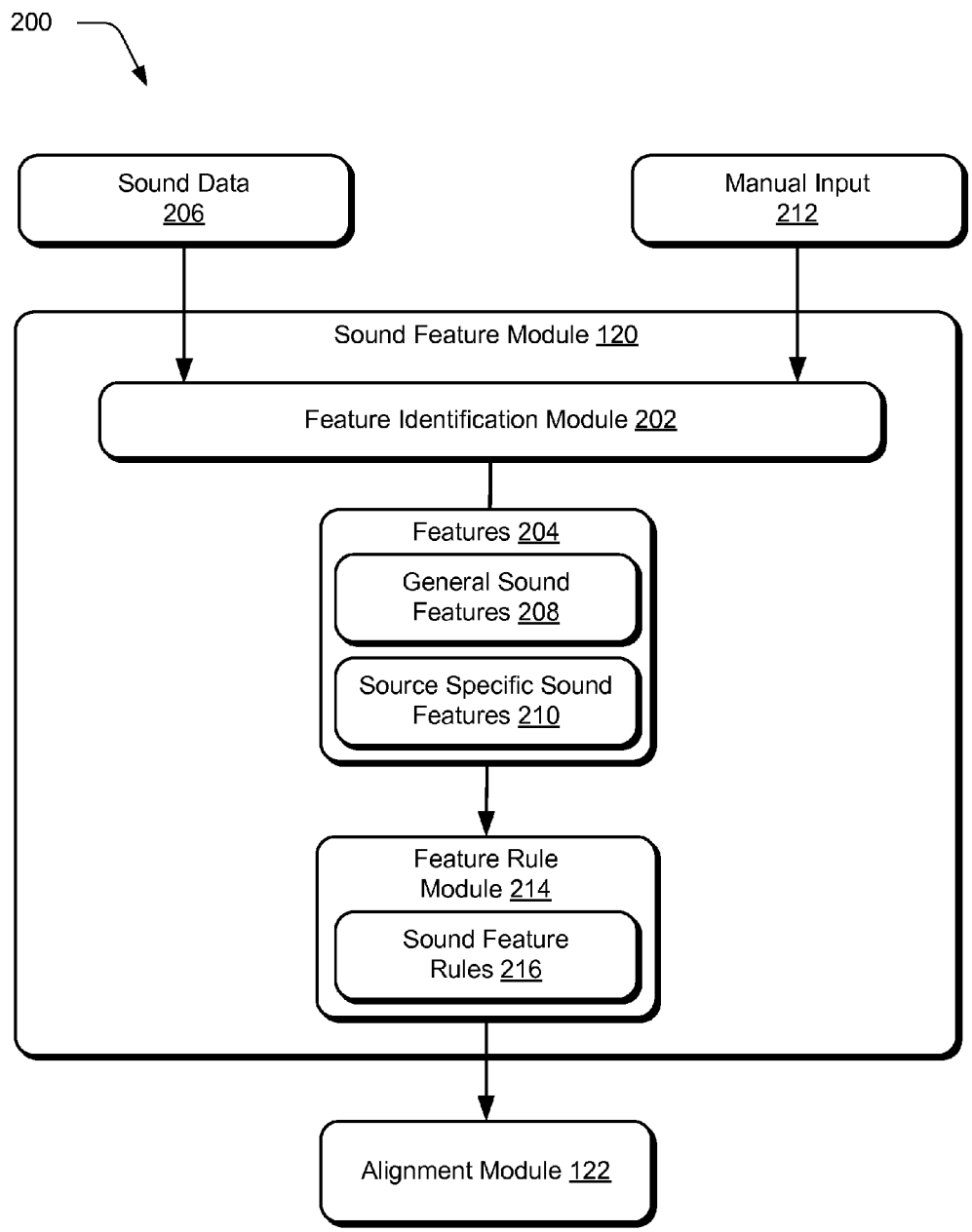
FIG. 2 depicts a system in an example implementation in which sound features are identified and leveraged to generate sound feature rules.

FIG. 2 depicts a system 200 in an example implementation in which sound characteristics are identified and leveraged to generate sound rate rules that reflect a natural sound model. A feature identification module 202 is illustrated that is representation of functionality to identify features 204 of sound data. Although speech is described in examples, it should be noted that this is not limited to spoken words and thus may also include other sounds, such as musical instruments, animals sounds, environmental sounds (e.g., rain, traffic), and even generated sounds such as sounds generated by a video game or other source.

The feature identification module 202, for instance, may be employed to process a corpus of sound data 206 to learn features 204 of the sound data 206 and relative priority of those features, i.e., to each other. This may be performed generally for a language or other sounds to generate general sound features 208 as well as for source specific sound features 210, such as for a particular speaker or other source. This may be performed in a variety of ways, such as through use of a hidden Markov model (HMM) or other sound learning technique as described below.

A variety of different features 204 may be learned automatically and without user intervention on the part of the rate identification module 202. For example, the features 204 may describe characteristics of frame of the sound data 206. This may include spectral characteristics (e.g., bases and weights as further described in relation to FIG. 3), level of transience, silence, frame energy, peak value, phoneme type, words, syllables, phones, whether indicative of a pause, and so on.

The features 204 may also describe a context of a frame in relation to one or more other frames of the sound data 206. For example, a sound uttered for a vowel sound "a" when used in a word "awful" may be different than when used in a word "Dad." This may also include whether the frame is indicative of a phrase onset, phrase offset, word onset, word offset, position within a word/phrase of a syllable, and so on. Accordingly, a context in which the sound is encountered may be different and therefore this difference may be defined by the features 204.

Manual inputs 212 may also be provided to the feature identification module 202 to generate the features 204. The feature identification module 202, for instance, may output a user interface via which a user may define features 204 manually, such as for particular syllables, phrases, words, sentences, phones, and other sounds such as transient sounds (e.g., an utterance of "t") as previously described. As above, this may include whether the frame is indicative of a phrase onset, phrase offset, word onset, word offset, position within a word/phrase of a syllable, and so on. Further, the features 204 may be specified for general sound features 208 as well as source specific sound features 210, such as speech of a particular user.

These features 204 may then be processed by a feature rule module 214 to form sound feature rules 216. The sound feature rules 216 may be configured to calculate a priority based on respective features to reflect a relative importance of features 204 in accordance with human perception. For example, the sound feature rules 216 may specify that frames having a higher energy are to have a higher priority than frames having lower energy. In this way, the sound feature rules 216 may then be employed by the alignment module 122 to perform alignment based at least in part on the priorities calculated for the frames, as opposed to conventional techniques in which each frame is given equal importance. An example of use of the sound feature rules 216 by the alignment module 122 may be found in relation to the following description and corresponding figure.

Figure 3:
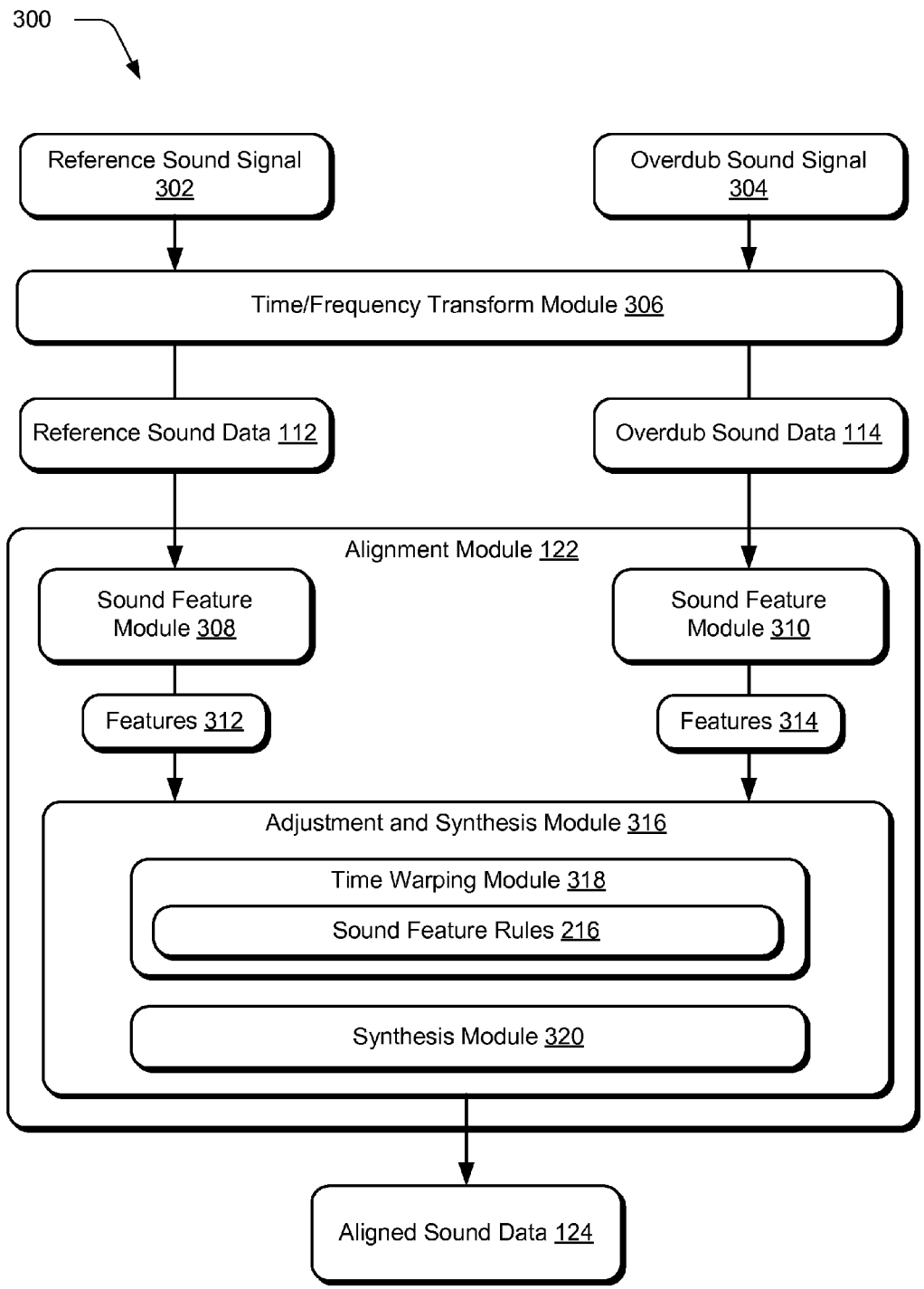
FIG. 3 depicts a system in an example implementation in which aligned sound data is generated from overdub sound data and reference sound data from FIG. 1 using sound feature rules of FIG. 2 that reflect differences in human perception.

FIG. 3 depicts a system 300 in an example implementation in which aligned sound data 124 is generated from overdub sound data 114 and reference sound data 112 from FIG. 1 using sound feature rules that reflect differences in human perception. A reference sound signal 302 and an overdub sound signal 304 are processed by a time/frequency transform module 306 to create reference sound data 112 and overdub sound data 114.

The sound data, for instance, may be used to form a representation of a respective signal. For example, a time-domain signal may be received and processed to produce a time-frequency representation, e.g., a spectrogram. Spectrograms may be generated in a variety of ways, an example of which includes calculation as magnitudes of short time Fourier transforms (STFT) of the signals. Additionally, the spectrograms may assume a variety of configurations, such as narrowband spectrograms (e.g., 32 ms windows) although other instances are also contemplated. Other examples are also contemplated, such as use of sound data that describes an original time domain representation of a signal.

Overdub sound data 114 and reference sound data 112 are illustrated as being received for processing by respective sound feature modules 308, 310 of the alignment module 120, which may or may not correspond to the feature identification module 202 of FIG. 1. Although illustrated separately, a single sound feature module may also be utilized for processing both the overdub sound data 114 and the reference sound data 112. The sound feature modules 308, 310 are representative of functionality to identify features in the sound data that are usable to uniquely identify particular portions of the sound data (e.g., spectral characteristics and so on), illustrated examples include features 312 of the reference sound data 112 and features 314 for the overdub sound data 114.

The features 312, 314 may take a variety of different forms. For example, the features 312, 314 may result from a calculation of bases (e.g., spectral characteristics) and weights (e.g., temporal features) of the reference sound data 112 and the overdub sound data 114, respectively. Bases, for instance, may include spectral characteristics such as spectral basis vectors, which may be considered spectral building blocks of the sound data. Weights may include temporal features, such as speech weights, noise weights, and so on. The weights may define a temporal evolution of a signal such that at each time instance of the signal, the signal may be defined by a linear combination of the blocks defined by the bases.

The feature modules 308, 310 may employ a variety of different techniques to compute the features 312, 314. For example, the features 312, 314 may be computed with an algorithm, such as Probabilistic Latent Component Analysis (PLCA), non-negative matrix factorization (NMF), non-negative hidden Markov (N-HMM), non-negative factorial hidden Markov (N-FHMM), and the like. Other features are also contemplated, such as contextual features as described above.

The features 312 identified in the reference sound data 112 and the features 314 identified from the overdub sound data 112 114 may then be used by an adjustment and synthesis module 316 to generate aligned sound data 124. This may include "speeding up" and "slowing down" portions of the overdub sound data 114 to match feature timing in the reference sound data 112.

For example, the features 312, 314 may be described using matrices of speech weights for the reference sound data 112 and overdub sound data 114, respectively. The features 312, 314 and priority assigned to the features 312, 314 may be used to analyze how the overdub sound data 114 may be warped in time by the time warping module 318 to align the respective features, such as by a global offset or sampling factor, compressing, stretching, and so on.

The time warping module 318, for instance, may employ dynamic time warping that leverages a similarity matrix of the reference and overdub features, respectively. The similarity matrix may be configured in a variety of ways, such as a two-dimensional rectangular matrix. One dimension may express length, in number of windows, for the reference sound data 112 and the other dimension may be the length for the overdub sound data 114. Each element of the matrix may give a similarity distance between features, e.g., a cosine distance.

As previously described, conventional techniques treated each frame equally (e.g., assigned a value of 1 to −1) and thus could often form results that were inconsistent with human perception. However, in the techniques described herein priority of frames for alignment may be prioritized in accordance with human perception, thus promoting a natural sounding output.

A similarity matrix, for instance, may be sized "O-by-R" where "O" is a number of overdub frames and "R" is the number of reference frames. The similarity matrix thus contains a comparison of every frame of the overdub sound data 114 to every frame of the reference sound data 112. This is typically done by a normalized inner product (e.g., cosine distance) as described above although other examples are also contemplated. A value of "1" means that the two frames are identical (up to a scale factor) and a value of "−1" means that the two frames are complete opposites. This may be done with spectral or spectrally-derived features as described above.

These values may then be scaled by the sound feature rules 216 as generated in FIG. 2 to assign a priority to the frames. For example, the sound feature rules 216 may be configured such that values are increased to place higher importance on frames with phrase onsets and higher energy by the time warping module 318. Thus, in this example each frame's features would be used to scale the original "−1" to "+1" value. The higher the scale factor, the higher the priority that is placed on that frame to perform the alignment.

Although scaling was described, a variety of other techniques may also be employed to assign priorities. The features, for instance, may be used to override the original value calculated based on the spectral characteristics, add an offset, and so on. Additionally, other linear or nonlinear scaling may be used to calculate the final values in the similarity matrix that are based on the spectral characteristics and the priorities.

The time warping module 318 may then use these calculated values to find the optimal alignment on the reference and overdub sound data 112, 114 based on the information in the similarity matrix. A synthesis module 320 may then synthesize aligned sound data 124 using the information learned in the previous time warping step by the time warping module 318. The result is aligned sound data 124 that has the spectral characteristics of the overdub and the timing of the reference.

An optimal path, for instance, may be determined to minimize the error between the features of the reference sound data 112 and overdub sound data 114, respectively, such that the path is most similar in the most number of frames. For instance, a path may indicate that to align a given frame of the reference sound data 112 and overdub sound data 114, the reference sound data 112 and the overdub sound data 114 are each to be advanced by a single frame. For another frame, a path may indicate that the reference sound data 112 is to be advanced two frames and the overdub sound data 114 is to remain on a current frame, i.e., is not to be advanced. The paths may indicate whether to stretch, compress, time-shift, or otherwise warp one of the signals to better match the other signal.

Thus, automatic time alignment may be performed by the adjustment and synthesis module 316 to stretch and compress sound data to match the timing of other sound data, e.g., the overdub sound data 114 to the reference sound data 112. This may be performed by dividing the sound data into a series of short frames and analyzing the spectral content of the frames. Based on this analysis, a determination may be made as to how the timing of the frames from the overdub sound data 114 is to be changed such that the spectral characteristics best match the frames in the reference sound data 112. Further, this analysis may take into an account a priority assigned to the frames. In this way, the timing and priority information may be used to modify the timing of the overdub sound data 114 to match the desired timing of the reference sound data 112 that is consistent with human perception.

Example Procedures

The following discussion describes sound feature priority alignment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
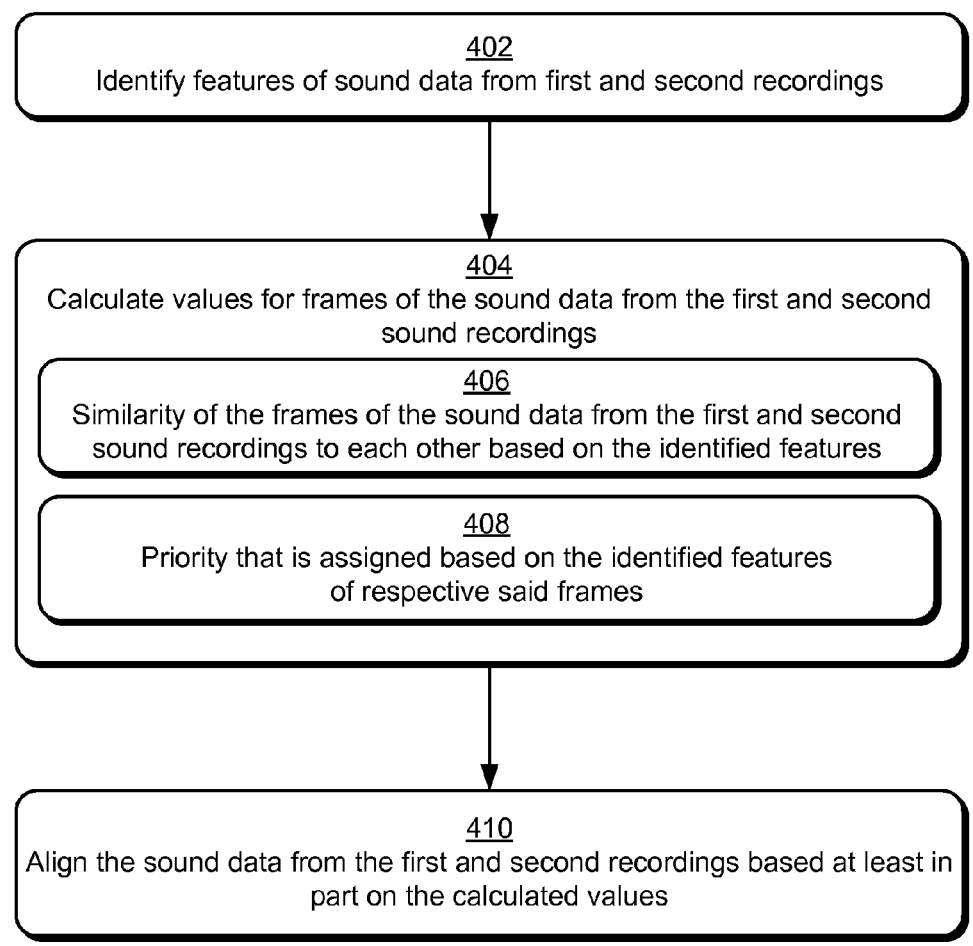
FIG. 4 is a flow diagram depicting a procedure in an example implementation in which identification of features is utilized to generate sound feature rules that reflect human perception.

FIG. 4 depicts a procedure 400 in an example implementation in which identification of features is utilized to generate sound feature rules that reflect human perception. Features of sound data are identified from first and second recordings (block 402). This may include spectral characteristics of the sound data as well as a context in which the frame relates to other frames in the sound data, e.g., a beginning or end of a phrase or so on.

Values are calculated for frames of the sound data from the first and second sound recordings (block 404). The values, for instance, may be calculated such that each of the values is based on similarity of the frames of the sound data from the first and second sound recordings to each other based on the identified features (block 406). The values, for instance, may be based on similarity of spectral and other characteristics of the frames. Each of the values is also assigned a priority that is based on the identified features of respective frames (block 408). The values, for instance, may be used to scale or offset the similarity values above and/or may be used to override those values.

The sound data from the first and second recordings is then aligned based at least in part on the calculated values (block 410). In this way, the alignment module 122 may take into account both similarity of features as well as a priority assigned to the features to align sound data, such as to reflect human perception.

Figure 5:
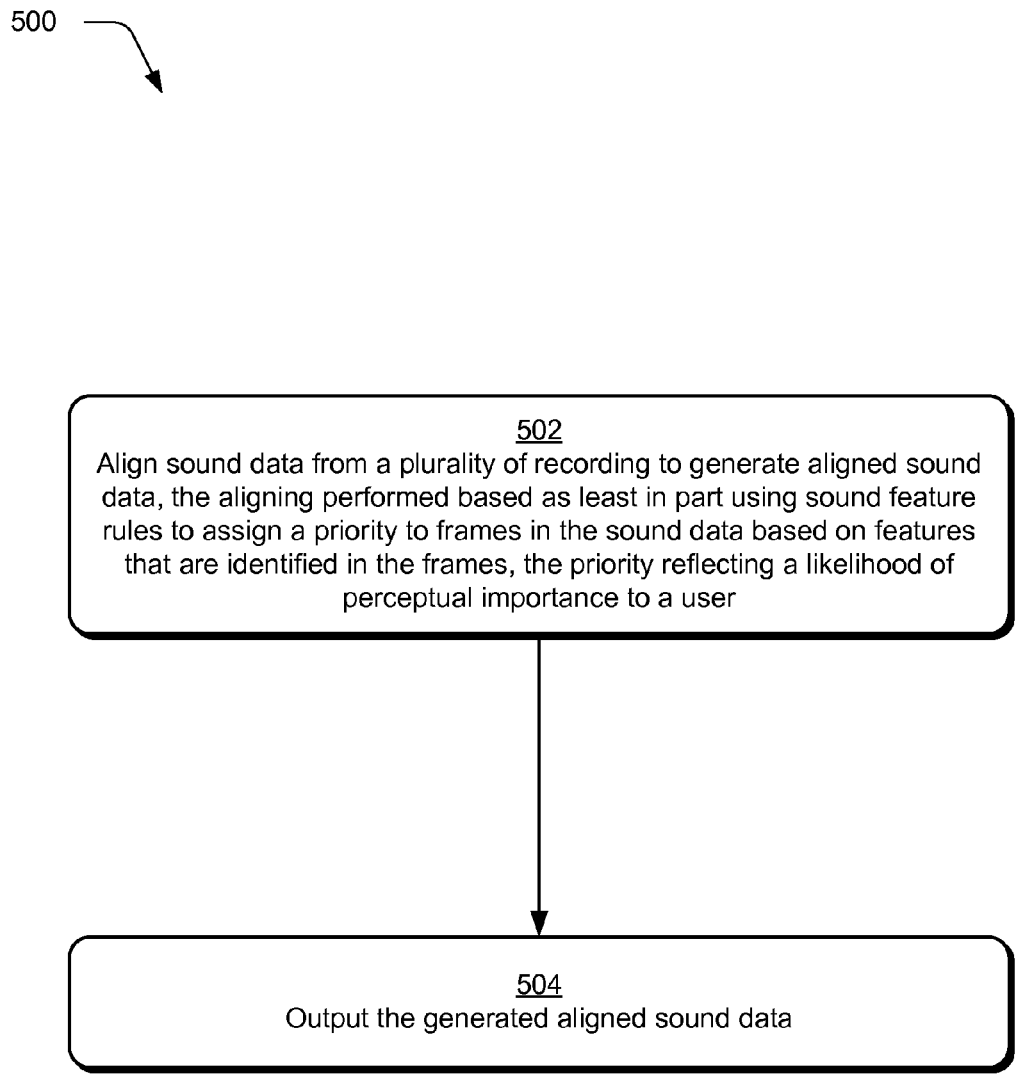
FIG. 5 is a flow diagram depicting a procedure in an example implementation in which sound feature rules are used to align sound data.

FIG. 5 depicts a procedure 500 in an example implementation in which sound features rules are used to assign a priority that is usable to align sound data. Sound data is aligned from a plurality of recordings to generate aligned sound data, the aligning performed based as least in part using sound feature rules to assign a priority to frames in the sound data based on features that are identified in the frames, the priority reflecting a likelihood of perceptual importance to a user (block 502). The sound feature rules, for instance, may be generated as described in relation to FIG. 2 automatically and without user intervention by one or more modules as well as specified manually by a user through interaction with a user interface. These rules may reflect a likelihood of perceptual importance to a user, such as the likelihood that a user notices alignment or misalignment of one feature versus another.

The generated aligned sound data may then be output (block 504). This may include display in a user interface, e.g., a representation of the sound data as a spectrogram, output using a sound output device (e.g., a speaker), storage to a computer-readable storage media, and so on.

Example System and Device

Figure 6:
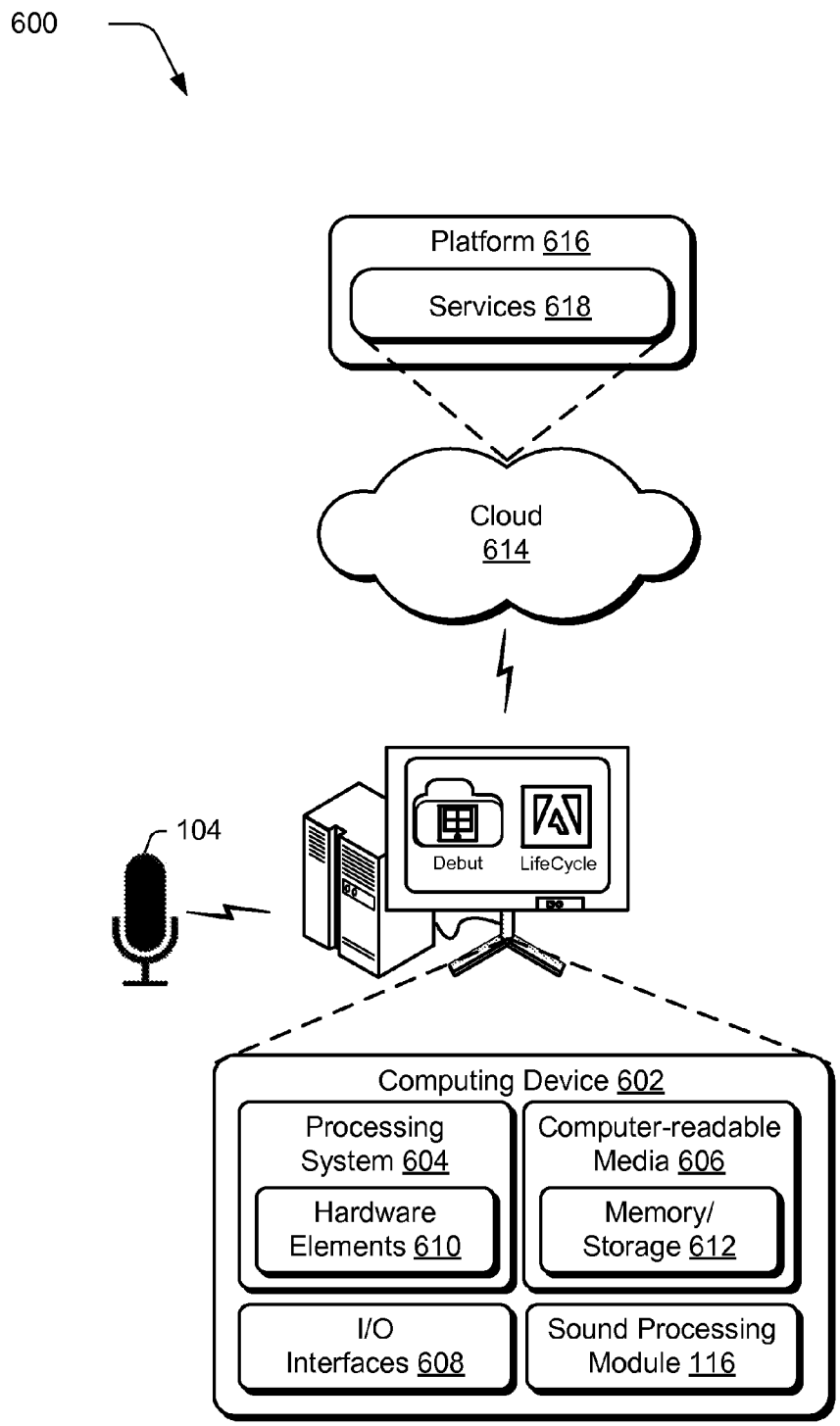
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the sound processing module 116, which may be configured to process sound data, such as sound data captured by an sound capture device 104. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for services 618. The platform 616 abstracts underlying functionality of hardware (e.g., servers) and software resources of the cloud 614. The services 618 may include applications and/or data that can be utilized while computer processing is executed on servers that are remote from the computing device 602. Services 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand. Accordingly, in an interconnected device embodiment, implementation of functionality described herein may be distributed throughout the system 600. For example, the functionality may be implemented in part on the computing device 602 as well as via the platform 622 616 abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   identifying features of sound data from a plurality of recordings;
   calculating values for individual frames of the sound data from the plurality of recordings, each of the values based on a similarity value scaled by a priority value, wherein:
      the similarity value corresponds to a similarity determined using a similarity matrix built by comparing a first set of individual frames of a first of the plurality of recordings to a second set of individual frames of a second of the plurality of recordings, wherein the similarity matrix represents a comparison between the first set of individual frames and the second set of individual frames computed using a normalized inner product of compared frames; and
      the priority value assigned to individual frames of the sound data based on the identified features of the sound data as the identified features occur in the respective individual frames of the sound data, the priority value based on how speech characteristics of a particular frame compare to speech characteristics of other individual frames of the sound data; and
   aligning the sound data from the plurality of recordings based at least in part on the calculated values that are based on the similarity value scaled by the priority value, wherein individual frames of the sound data from the plurality of recordings are more likely to be aligned between different recordings when the priority value assigned to the individual frames of the sound data based on the identified features is higher than priority values assigned to other individual frames; and
   outputting the aligned sound data.

2. A method as described in claim 1, wherein the identified features include features that describe spectral characteristics of the sound data.

3. A method as described in claim 2, wherein the spectral characteristics are described using bases and the identified features further include weights that describe temporal features of the sound data.

4. A method as described in claim 1, wherein the identified features include features that describe a context of one or more said frames of the sound data.

5. A method as described in claim 4, wherein the context indicates a phrase onset, phrase offset, word onset, or word offset.

6. A method as described in claim 1, wherein the identified features describe characteristics of a respective frame, the characteristics including level of transience, silence, frame energy, peak value, pitch, frequency content, or phoneme type.

7. A method as described in claim 1, wherein the scaling is performed using linear or non-linear scaling.

8. A method as described in claim 1, wherein the calculating is performed such that the priority value that is assigned to the individual frames of the sound data from the plurality of sound recordings based on the identified features is used to override or apply an offset to a value indicating the similarity of the frames of the sound data to each other.

9. A method as described in claim 1, wherein the priority value is assigned using one or more sound feature rules such that the priority value reflects a likelihood of perceptual importance to a user.

10. A method as described in claim 1, further comprising building a similarity matrix using the calculated values that describes a comparison between frames from the sound data from a first said recording with frames from the sound data from a second said recording and wherein the similarity matrix is used as part of the aligning.

11. A system comprising:
    at least one module implemented at least partially in hardware and configured to identify features of sound data; and
    one or more modules implemented at least partially in hardware and configured to automatically generate sound feature rules, the sound feature rules generated based on the identified features of the sound data, the one or more modules further configured to use the sound feature rules to assign a priority value to individual frames of the sound data based on features that are identified in the frames of the sound data, the one or more modules further configured to use the priority value to scale a similarity value of frames of different recordings to determine an alignment of sound data between the different recordings, the similarity value determined using a similarity matrix built by comparing a first set of individual frames of a first of the plurality of recordings to a second set of individual frames of a second of the plurality of recordings, wherein the similarity matrix represents a comparison between the first set of individual frames and the second set of individual frames computed using a normalized inner product of compared frames, the sound feature rules specifying that frames of the sound data having a higher energy are assigned a higher priority value for alignment than frames of the sound data having a lower energy.

12. A system as described in claim 11, wherein the identified features include:
    features that are specified by a user;
    features that describe spectral characteristics of the sound data;
    features that describe a context of one or more said frames of the sound data to other frames, the context indicating a phrase onset, phrase offset, word onset, or word offset; or
    features that describe characteristics of a respective said frame, the characteristics including level of transience, silence, frame energy, peak value, or phoneme type.

13. A system as described in claim 11, wherein the one or more modules are further configured to align the sound data from the plurality of recordings to each other using the sound feature rules.

14. A computing device comprising:
    one or more processors; and
    one or more computer-readable storage media having instructions stored thereon that, responsive to execution by the one or more processors of the computing device, causes the computing device to perform operations comprising:
    aligning sound data from different recordings of a plurality of recordings to generate aligned sound data, the aligning performed based at least in part using sound feature rules to assign a priority value to individual frames in the sound data based on features that are identified in the individual frames of the sound data and scaling a similarity value by the priority value, the similarity value corresponding to a similarity determined using a similarity matrix built by comparing a first set of individual frames of a first of the plurality of recordings to a second set of individual frames of a second of the plurality of recordings, wherein the similarity matrix represents a comparison between the first set of individual frames and the second set of individual frames computed using a normalized inner product of compared frames, the sound feature rules configured such that priority values are increased to place higher importance on frames of the sound data with phrase onsets; and outputting the generated aligned sound data.

15. The computing device as described in claim 14, wherein the features referenced by the sound feature rules include:
   features that describe spectral characteristics of the sound data;
   features that describe a context of one or more said frames of the sound data to other frames, the context indicating a phrase onset, phrase offset, word onset, or word offset; or
   features that describe characteristics of a respective said frame, the characteristics including level of transience, silence, frame energy, peak value, pitch, frequency content, or phoneme type.

16. The computing device as described in claim 14, wherein the sound features rules are utilized to scale or override the similarity value.

17. The computing device as described in claim 14, wherein the outputting is performed by storing the generated aligned sound data to computer-readable storage media, displaying a representation of the generated aligned sound data in a user interface, or outputting the generated aligned sound data via a sound output device.

18. A system as described in claim 11, wherein the priority value is assigned using the one or more sound feature rules such that the priority reflects a likelihood of perceptual importance to a user.

19. A method as described in claim 1, wherein the aligning further comprises determining an optimal path such that individual frames of the first of the plurality of recordings is the most similar to the individual frames of the second of the plurality of recordings in the most number of frames.

20. The computing device as described in claim 14, wherein the aligning further comprises determining an optimal path such that individual frames of the first of the plurality of recordings is the most similar to the individual frames of the second of the plurality of recordings in the most number of frames.

* * * * *